United States Patent [19]
Lipton

[11] Patent Number: 5,481,321
[45] Date of Patent: Jan. 2, 1996

[54] STEREOSCOPIC MOTION PICTURE PROJECTION SYSTEM

[75] Inventor: Lenny Lipton, Greenbrae, Calif.

[73] Assignee: StereoGraphics Corp., San Rafael, Calif.

[21] Appl. No.: 917,517

[22] Filed: Jul. 17, 1992

Related U.S. Application Data

[63] Continuation of Ser. No. 647,579, Jan. 29, 1991, abandoned.

[51] Int. Cl.⁶ ............................................. G03B 35/00
[52] U.S. Cl. .................. 352/57; 352/60; 352/62; 352/63; 359/465
[58] Field of Search ............................ 352/57, 60, 62, 352/63; 359/465

[56] References Cited

U.S. PATENT DOCUMENTS

| 2,099,694 | 11/1937 | Land . | |
|---|---|---|---|
| 2,289,714 | 7/1942 | Land . | |
| 2,729,138 | 1/1956 | Bernier | 352/57 |
| 3,531,191 | 9/1970 | Bernier . | |
| 3,737,567 | 6/1973 | Kratomi | 352/57 |
| 3,825,328 | 6/1974 | Hoch . | |
| 3,851,955 | 12/1974 | Kent et al. . | |
| 3,990,087 | 11/1976 | Marks et al. . | |
| 4,017,166 | 4/1977 | Kent et al. . | |
| 4,175,829 | 11/1979 | Marks et al. . | |
| 4,183,633 | 1/1980 | Kent et al. . | |
| 4,235,503 | 11/1980 | Condon . | |
| 4,281,341 | 7/1981 | Byatt | 350/132 |
| 4,372,656 | 2/1983 | Marks et al. . | |
| 4,436,369 | 3/1984 | Bukowski . | |
| 4,464,028 | 8/1984 | Condon . | |
| 4,472,037 | 9/1984 | Lipton . | |
| 4,792,850 | 12/1988 | Lipton et al. | 350/132 |
| 4,870,486 | 9/1989 | Nakagawa et al. | 350/132 |
| 4,884,876 | 12/1989 | Lipton et al. . | |

Primary Examiner—Monroe H. Hayes
Attorney, Agent, or Firm—Limbach & Limbach

[57] ABSTRACT

A stereoscopic film projection system including one or more electro-optical light modulators used as part of, or in conjunction with, stereoscopic projection optics for the above-and-below film format employed for 35 mm theatrical cinema. The optical state of each modulator is voltage dependent, and the driving voltage therefor is generated in response to signals from a sensor positioned in the projector aperture. The sensor detects the presence or absence of index marks on the film. This arrangement insures that each subframe is maintained in a proper relationship with the optics' polarizers for preventing the projection of pseudostereoscopic motion pictures.

9 Claims, 8 Drawing Sheets

TABLE 1
SYMMETRICAL FORMAT

| DIMENSION | INCHES | MILLIMETERS |
|---|---|---|
| A | 0.825 NOM | 20.96 NOM |
| B | 0.728 MAX | 18.49 MAX |
| C | 0.738 NOM | 18.75 NOM |
| D | 0.324 MIN | 8.23 MIN |
| E | 1.151 MAX | 29.24 MAX |
| F = H | | |
| G | 0.374 NOM | 9.50 NOM |
| J | 0.020 NOM | 0.51 NOM |

TABLE 2
ASYMMETRICAL FORMAT

| DIMENSION | INCHES | MILLIMETERS |
|---|---|---|
| A | 0.825 NOM | 20.96 NOM |
| B | 0.732 MAX | 18.59 MAX |
| C | 0.738 NOM | 18.75 NOM |
| D | 0.324 MIN | 8.23 MIN |
| E | 1.151 MAX | 29.24 MAX |
| F = H | | |
| G | 0.387 NOM | 9.83 NOM |
| J | 0.042 NOM | 1.07 NOM |

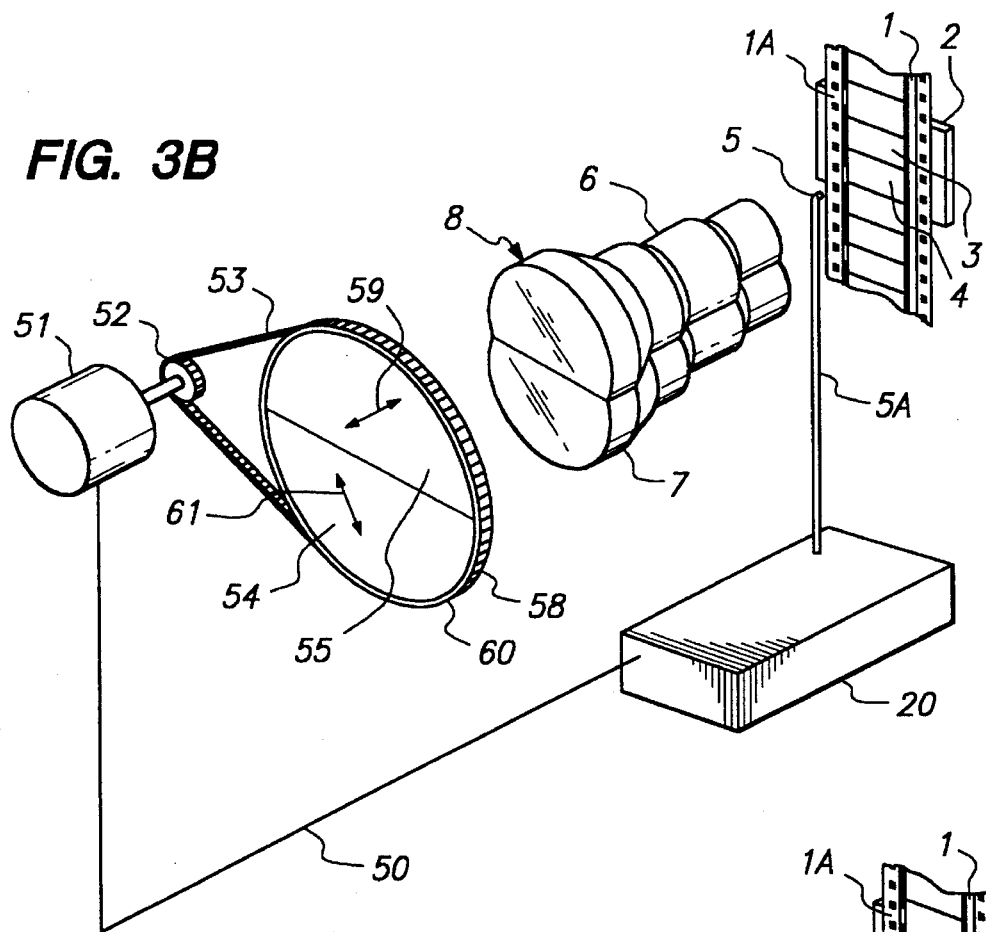

FIG. 5B
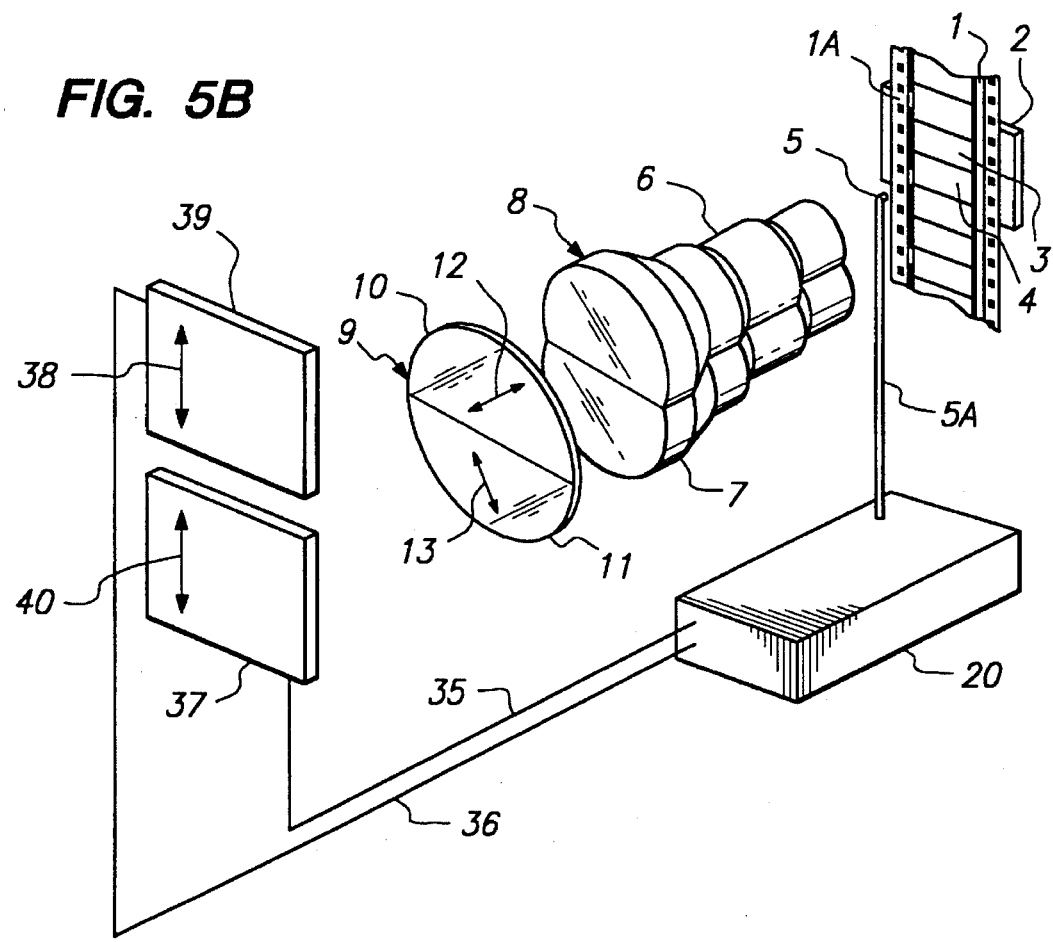
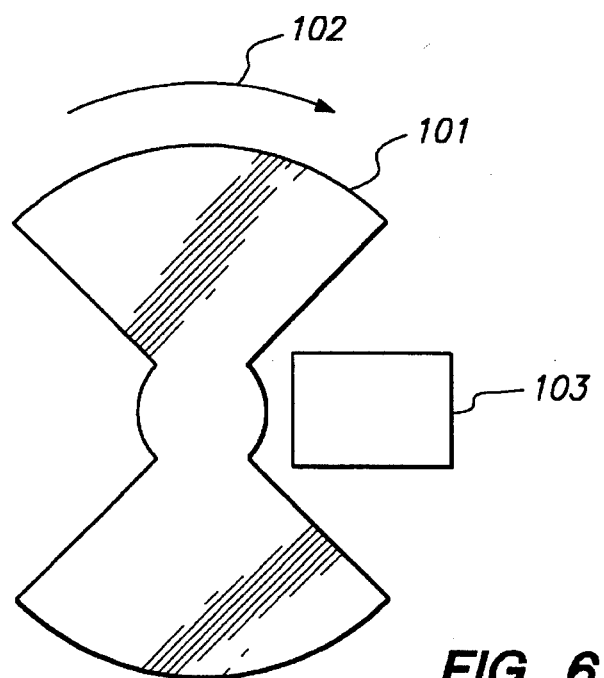
FIG. 6

STEREOSCOPIC MOTION PICTURE PROJECTION SYSTEM

This is a continuation of application Ser. No. 07/647,579 filed on Jan. 29, 1991 now abandoned.

FIELD OF THE INVENTION

The invention relates to use of liquid crystal modulators in a motion picture projection system to control the juxtaposition of subframes and polarizers for projection of stereoscopic motion pictures. The invention also relates to means for projecting more purely circularly polarized light than had heretofore been available in stereoscopic projection systems for image selection, to allow viewers to tip their heads while viewing the projected images without experiencing increased ghosting.

BACKGROUND OF THE INVENTIONS

The history of the stereoscopic cinema has attributes in common with the addition of other reality heightening technology for the projection of motion pictures. This includes the addition of color, sound, and wide aspect ratio projection. In every case the initial technology called for the use of multiple projectors or playback devices to achieve the desired enhancement. For example, in the late '20's, for the original Vitaphone sound system developed by Western Electric, a phonograph turntable was synchronized to the motion picture projector to provide lip synchronized sound. In the case of the wide screen Cinerama process in the early 1950's, three interlocked projectors were used to achieve the desired aspect ratio by means of a triptych on a curved screen. Cinerama was superseded by techniques using anamorphic lenses for 35 mm projection, or by means of the projection of wide aspect ratio 70 mm. Both of these approaches are superior in that they use a single projector to achieve the desired effect.

For color motion pictures, in the silent era, at least on a prototype basis, multiple projectors were used to produce additive color images, but soon techniques were evolved to do away with multiple projectors. Subframes were incorporated into the existing motion picture frame, with each subframe carrying a record of a portion of the visible spectrum. When projected through appropriate color filters and lenses, the resultant image was an additive color display.

However, such displays proved to be unsatisfactory and gave way to integral print stock incorporating the color information in three layers for the projection of subtractive color images.

For the projection of stereoscopic motion picture films, the ideal solution, at least from a technological, if not from a product point of view, is the Vectograph, which was the subject of considerable effort on the part of Mahler and Land, of the Polaroid Corporation. The Vectograph encoded the polarization characteristics of the image on the frame of a single piece of film, as described in U.S. Pat. No. 2,289,714, issued Jul. 14, 1942. No special projection lens or polarizing filter is required. The viewer wears the standard polarizing glasses. Footage recently viewed of a Vectograph test made by Polaroid in the 1950's showed that the process produced a beautiful result. The Vectograph process is an imbibition process, like that of the Technicolor technique.

The history of stereoscopic projection of motion pictures, to some extent, recapitulates the other technological innovations which have been briefly described above. Unfortunately, the ultimate technical solution, the incorporation of both left and right perspective viewpoints in an integral form, as would have been possible with the Vectograph, is no longer viable with the abandonment, in the West, of the Technicolor imbibition process. The commercial possibility of Vectograph release prints has vanished.

Initially, when stereoscopic films were projected in the late 30's, for exhibition at world's fairs, mechanically or electrically interlocked projectors were used. In the early 1950's the same approach was tried in neighborhood theaters, using the two projectors in the booth required for changeovers. The technical challenges involved in this operation; the frame for frame synchronization of the prints, the control of the phase relationship of the projector shutters, and the coordination of the optical characteristics of the two images, became a quality control problem which was never solved for neighborhood theaters. Today, it would be difficult to use such a technique, because most theaters have only one projector with a large reel platter, eliminating the need for changeovers between reels.

The practice of projecting stereoscopic motion pictures using two projectors continues to this day for world's fair exhibition. In venues of this type, by using trained and motivated technicians, it is possible to use interlocked projectors. This technique is in daily use by Disney and other organizations.

Commercial attempts were made beginning in the early 1950's to incorporate two subframes, one for the left perspective and the other for the right perspective on a single piece of film. Various types of proposals were made which can be found in Lipton's *Foundations of the Stereoscopic Cinema*, Van Nostrand and Reinhold (1982). Eventually, a technique was accepted in which two subframes are incorporated into the area of an existing 35 mm motion picture frame, reminiscent of the approach used for additive color motion pictures. These subframes are arranged as shown in FIG. 1. The result is a format which has an aspect ratio which is wider than that used for so-called "scope" films. Generally speaking, the aspect ratio of motion pictures these days, when projected in theatrical cinemas, is (in the United States) between 1.85:1 (wide-screen) and 2.35:1 (scope). The latter aspect ratio is usually achieved using anamorphic projection lenses. A typical practice is to project all films on a screen with masking fixed at a 2:1 aspect ratio. Therefore, the aspect ratio of the subframe stereoscopic format, at approximately 2.5:1, provides a wider projected image than is desirable, or is in common practice. As the inventor has recognized, the wider than necessary aspect ratio makes it possible to mask a portion of the subframe area to allow for the location of an index mark.

In order to properly display a motion picture using the above-and-below (also known as the over-and-under) format described here and illustrated in FIG. 1, the projection device must accomplish the tasks of simultaneously superimposing the two images on the projection screen and of also polarization encoding the images so that polarizing selection devices may be used by audience members. Various types of projection devices have been described in the literature and manufactured and offered for sale. There projection devices use lenses, mirrors, or prisms, or combinations of such elements in their construction. They are either used in place of or as an add-on for use in conjunction with the existing projection lens. A partial list of such devices includes Kent et al., U.S. Pat. No. 3,851,955, Kent et al., U.S. Pat. No. 4,017,166, Kent et al., U.S. Pat. No. 4,183,633, Condon, U.S. Pat. No. 4,235,503, and Marks et al., U.S. Pat. No. 4,372,656.

The projection optics employ sheet polarizers to polarize the image of each subframe. These polarizers are usually of the linear type, and their axes are orthogonal and at 45 degrees to the horizontal, following the industry practice. As mentioned previously, the means for combining or superimposing the two images can involve the use of prisms, lenses, or mirrors. Many such devices were sold to exhibitors in the early 1980's, when there was a brief revival of the three-dimensional cinema.

Different approaches have been used for producing the above-and-below subframe format. It is known to those who are familiar with the art that it is possible to use interlocked dual cameras to produce stereoscopic photography and then to optically print from the resultant films the above-and-below format shown in FIG. 1. Some inventors have decided that it would be desirable to produce this format at the time of photography, thereby simplifying the process since only one camera is needed and optical printing is eliminated. These inventors and inventions include Bernier, U.S. Pat. No. 3,531,191, Hoch, U.S. Pat. No. 3,825,328, Marks et al., U.S. Pat. No. 3,990,087, Marks et al., U.S. Pat. No. 4,175,829, Bukowski, U.S. Pat. No. 4,436,369, and Condon, U.S. Pat. No. 4,464,028. By no means is this list complete, but it is representative and shows that there has been, as is the case for projection optics, considerable effort expended in this art. Many of these patents have been the basis for products which have been or are now commercially employed in the theatrical film industry.

Tables 1 and 2, set forth in FIG. 1(a) and FIG. 1(b) respectively, provide the dimensions for two conventional variants of the above-and-below film format shown in FIG. 1. FIGS. 1, 1(a), and 1(b) are provided from the Society of Motion Picture and Television Engineers working group formed to establish standards for the projection of 35 mm theatrical stereoscopic motion pictures. One variant (represented by FIG. 1(a)) is called the symmetrical format and the other (represented by FIG. 1(b)) the asymmetrical format. In the case of the symmetrical format, the center-to-center distance between any two successive subframes (i.e., subframe A and subframe B shown in FIG. 1 and the subframes adjacent to them) is identical, namely 0.374 inches. In the case of the asymmetrical format, the subframe center-to-center distance will vary depending upon whether one is measuring the center-to-center distance between an A subframe and the B subframe above it, or the center-to-center distance between a B subframe and the A subframe above it. This difference between the symmetrical format and the asymmetrical format is an important concept because the invention disclosed here can only be made to work with the symmetrical subframe format, for example that given in Table 1. If the invention disclosed herein were to be applied to film using the asymmetrical subframe arrangement shown in Table 2, or for any other format which is not symmetrical, the resultant projected image would exhibit vertical parallax. Vertical parallax, as is well known in the art, and explained in Lipton's *Foundations of the Stereoscopic Cinema,* cited above, is undesirable when present in stereoscopic projection.

Amongst the many challenges that exist with regard to using the subframe technique for stereoscopic motion pictures, two of the most critical are projecting images which have symmetrical illumination and projecting images which remain stereoscopic rather than pseudostereoscopic. The first concern has been addressed in Lipton's U.S. Pat. No. 4,472,037. Using the technique described in U.S. Pat. No. 4,472,037, it is possible rapidly to observe the relative intensity of the two projected subframes to control the illumination so that the vignetting can be made congruent for both left and right projected image fields. There must be a point-for-point correspondence in terms of illumination between the left and right subframes. If this condition cannot be achieved to within a given tolerance, the result for the viewer is substantial fatigue, or what people often call eyestrain. Even though the viewer may not be able to articulate the problem, it is one that needs to be addressed.

There is another problem which is of epidemic proportions in the projection of stereoscopic motion pictures using the subframe technique, and the invention disclosed herein addresses this problem. The particular subframe must remain associated with the appropriate polarizer. The individual light path of each subframe passes through a polarizing filter, which is part of the projection lens or attachment. It is necessary to maintain the proper location of each left and right subframe with the optical system. That is to say, the subframes must always be positioned properly within the projector aperture. They must always be positioned as shown in FIG. 1 so that subframe A is the right image and B the left image.

This is not always accomplished in practice, and there are two causes for the problem. One occurs in threading up the print in the projector. The second problem occurs when the reels are assembled. The sequence of subframes must remain intact. A loss of sequence can come about during assembly of the print for projection. During assembly the individual reels of the film are placed on a large platter, and at this time it is possible to lose the sequence. If the person assembling the print makes the splice at the subframe frameline, rather than the frame line, the proper sequence will be lost, and the projected image will become pseudoscopic (pseudostereoscopic). In this case the subframes, rather than having the proper sequence of "left, right, left, right, and so on," would follow the sequence "right, left, left, right, left, right," or the sequence "left, right, right, left, right, left." When viewing a projected pseudoscopic image, the left eye will see the image intended for the right eye and vice versa. Often the conflict of stereoscopic and other depth cues, such as perspective or interposition, will preclude the viewer from seeing that the image has become "inside out", but it will no longer be stereoscopic and the result will be disturbing for most viewers. The left eye will be seeing the right eye's image and vice versa, because each left subframe image is being polarized with the polarizing filter meant for the right subframes. For the case of selection with linearly polarized light, the new polarization axis will be orthogonal to its intended axis.

Since every person in the theater is wearing polarizing spectacles using linear polarizers whose axes are orthogonal, the loss of subframe sequence will consequently produce the pseudoscopic effect since the combination of polarizer at the projector lens or attachment and the analyzer in the eyewear will select the left image for the right eye and vice versa. One peculiar method to correct for this mistake is for the audience members to remove their 3D glasses and turn them upside down.

Stereoscopic motion pictures using the subframe technique will often have the print threaded improperly or have had an interrupted sequence. In the first case, the left subframe occupies the position intended for the right subframe, the entire film will be projected pseudoscopically. In the later case it is observed that the sequence will switch between stereoscopic and pseudoscopic projection at the reel changes where assembly took place. Apparently it is beyond the ability of the person assembling the reels to distinguish between the frame line and the sub-frame line, despite the fact that instructions are given with the print and despite the fact that various schemes have been employed to index the sub-frames to preclude the production of pseudoscopic images.

It is therefore the intention of the present invention to prevent the image from becoming pseudoscopic and to maintain the relationship of each subframe with its polarizer.

An additional goal of the present invention will come as no surprise to those who have seen stereoscopic motion pictures. When tipping the head only a few degrees, the result will be a ghost image, because of crosstalk between the left and right projected channels. In a stereoscopic system, it is necessary to have good isolation between the two image channels so that the right eye only sees its appropriate image and the left eye sees its appropriate image. Using linear polarizers requires the audience members to place their heads rigidly in one position. It is known to those versed in the art that this is a result of the Law of Malus, which tells us that even a small rotation of one of a pair of crossed polarizers away from the orthogonal axes condition will produce substantial transmission. Therefore, the extinction of the unwanted image cannot be guaranteed, unless the audience members' heads are held in a fixed position.

However, the use of circularly polarized light, as described by Land in U.S. Pat. No. 2,099,694, provides an adequate solution to the problem and tends to preclude crosstalk even as audience members tip their heads while seeking different and more comfortable head positions. However, commercially available circularly polarizing filters, of a type including sheet quarter wave retarder and sheet linear polarizer, have not had the same good extinction ratio of their linearly polarized counterparts. Hence, a further improvement of the present invention is to produce circularly polarized light which is of superior quality to that which may be produced by commercially available circular polarizers built of plastic sheet quarter wave retarders and sheet polarizers.

SUMMARY OF THE INVENTION

The stereoscopic projection system of the invention has one or more electro-optical light modulators (preferably surface mode liquid crystal modulators) positioned in the optical path of the stereoscopic projection optics. The modulators control the polarization characteristic of the subframe image forming light, to cause the subframes to remain tagged with the polarization characteristics necessary for projection of proper stereoscopic (rather than pseudostereoscopic) images.

A preferred embodiment of the invention includes an electro-optical light modulator of the type known as a push-pull modulator, which comprises a pair of surface mode liquid crystal panels (such as panels 14 and 15 shown in FIG. 4A). Every other subframe of the motion picture print to be projected is indexed with a mark (such as one of marks 306 shown in FIG. 8). The presence or absence of each index mark is detected by a light sensor, and the sensor output is used to control the retardation state of the push-pull modulator to suitably alter the characteristics of the polarized light to match the requirements of each subframe's perspective view.

A BRIEF DESCRIPTION OF THE DRAWINGS

FIG. 1(a) is a table of the dimensions of an "asymmetrical" version of the above-and-below film format shown in FIG. 1.

Figure 3A:
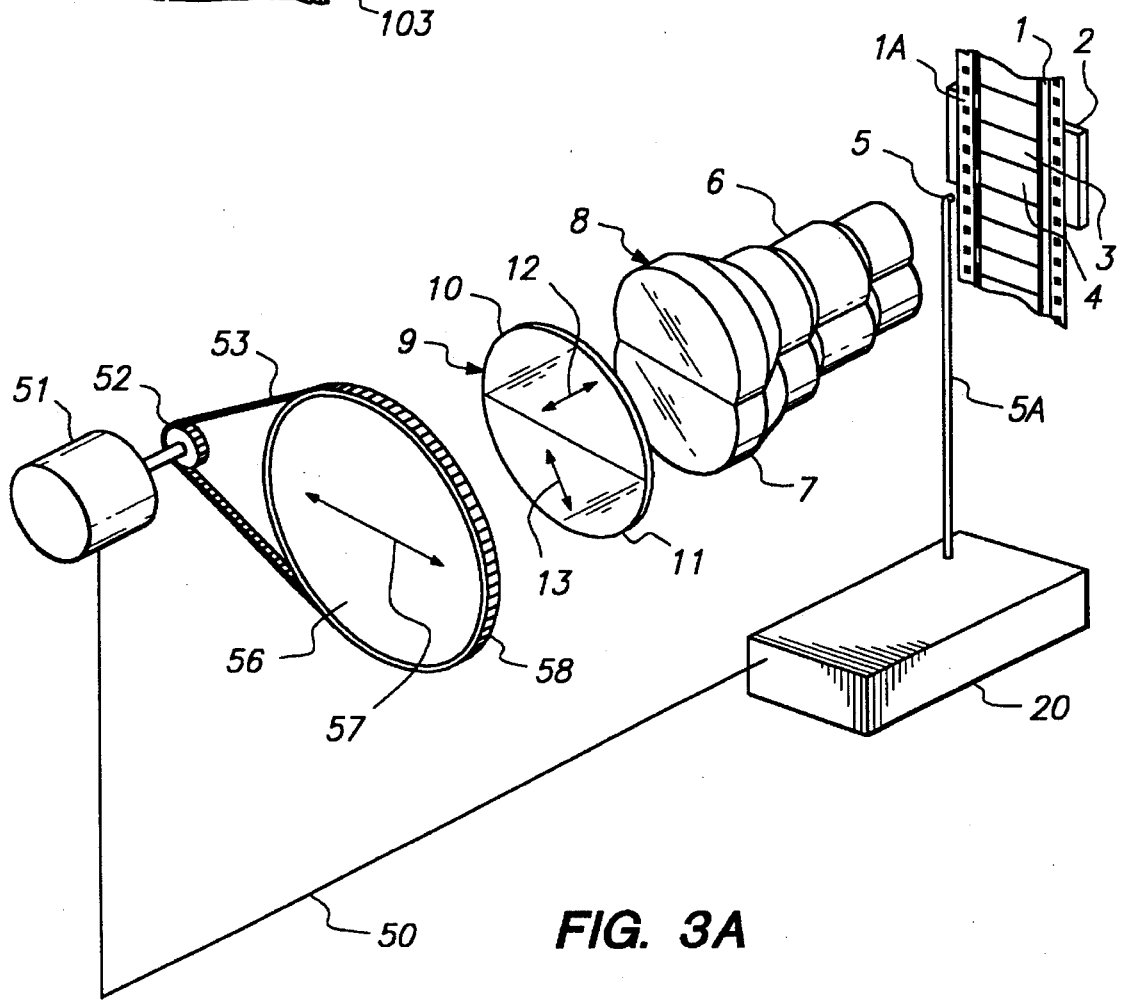

Each of FIGS. 3A and FIG. 3B shows an embodiment of the invention which employs electro-mechanical means for correcting pseudoscopic projection.

FIG. 4A is a perspective view of a first preferred embodiment of the inventive projector optical system, which employs a push-pull modulator.

Figure 4B:
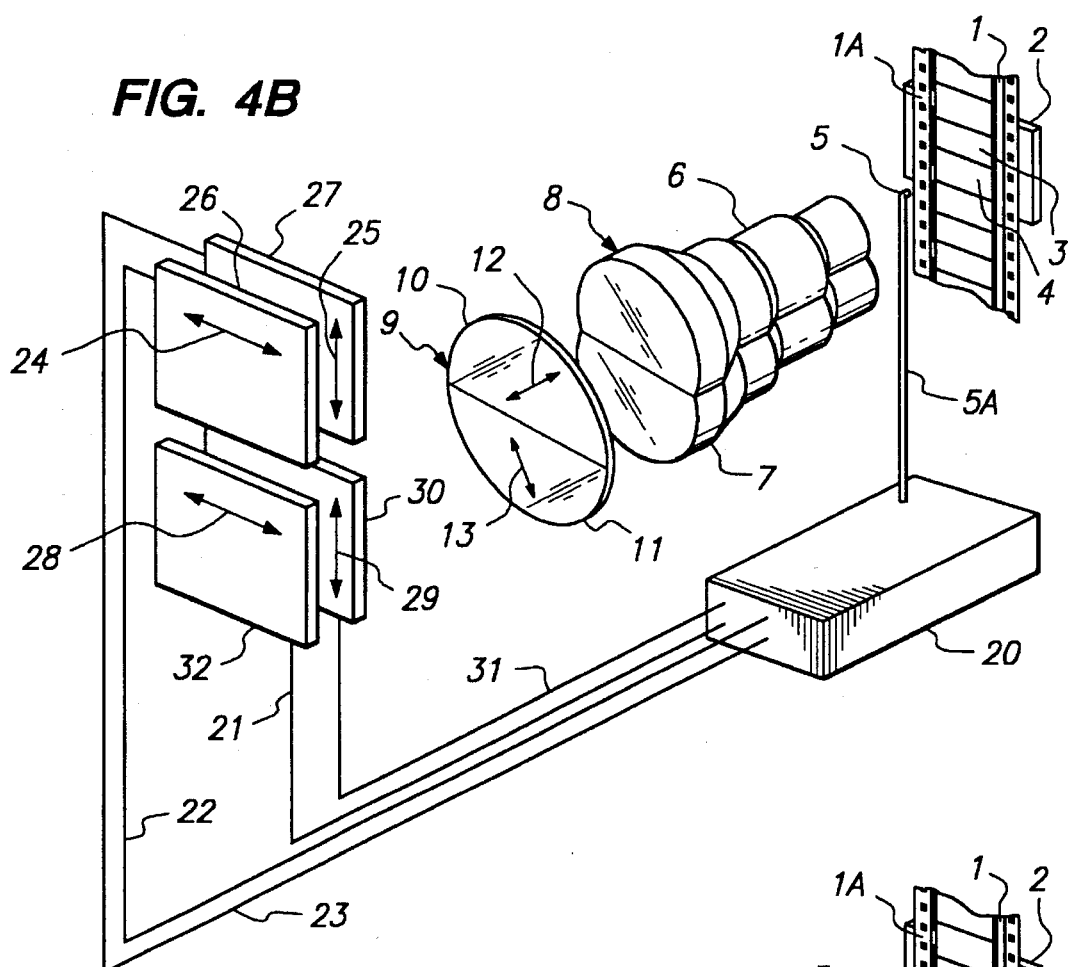

FIG. 4B is a perspective view of a second preferred embodiment of the inventive projector optical system, which employs a pair of push-pull modulators.

Figure 5A:
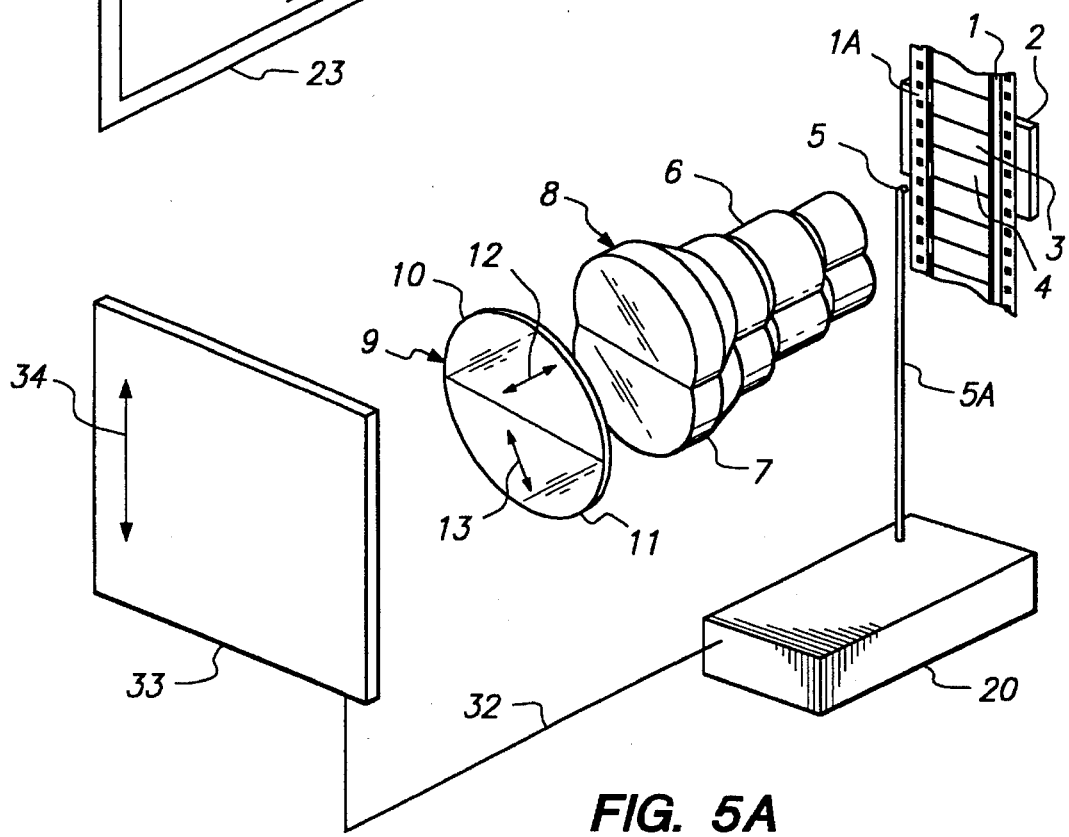

FIG. 5A is a perspective view of a third embodiment of the inventive projector optical system, which employs a single panel liquid crystal modulator.

FIG. 5B is a perspective view of a fourth embodiment of the inventive projector optical system, which employs a pair of single panel liquid crystal modulators.

FIG. 6 is a simplified, front elevational view of a motion picture interrupting shutter, of a type suitable for inclusion in the inventive system.

Figure 7A:
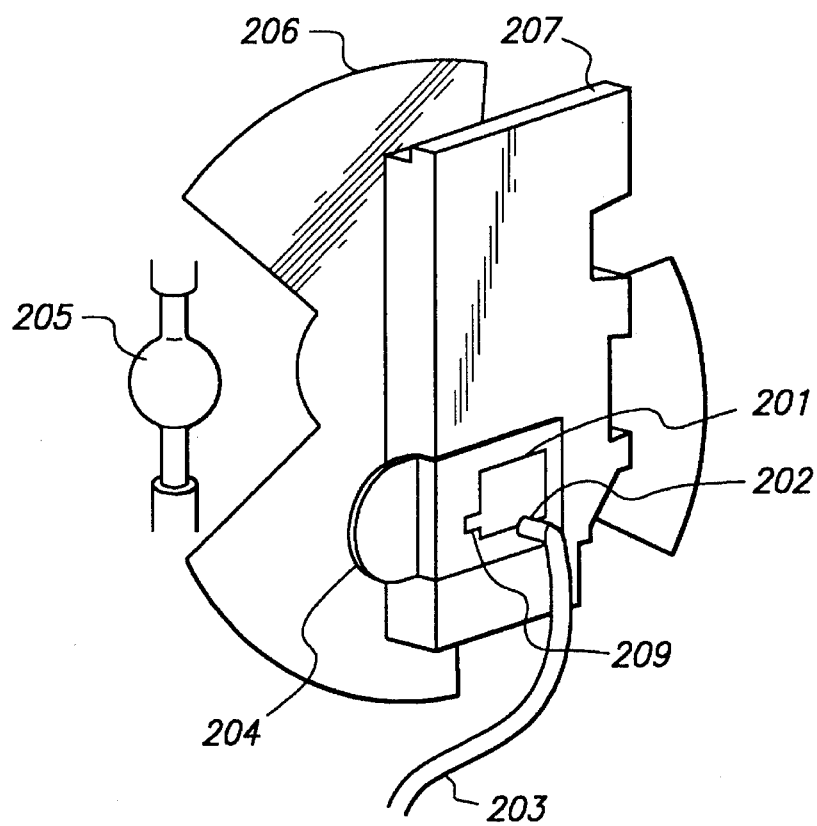

FIG. 7A is a simplified perspective view of a film trap with aperture plate, shutter, and lamp house, to which has been added a sensor for detection of pseudoscopic images.

Figure 7B:
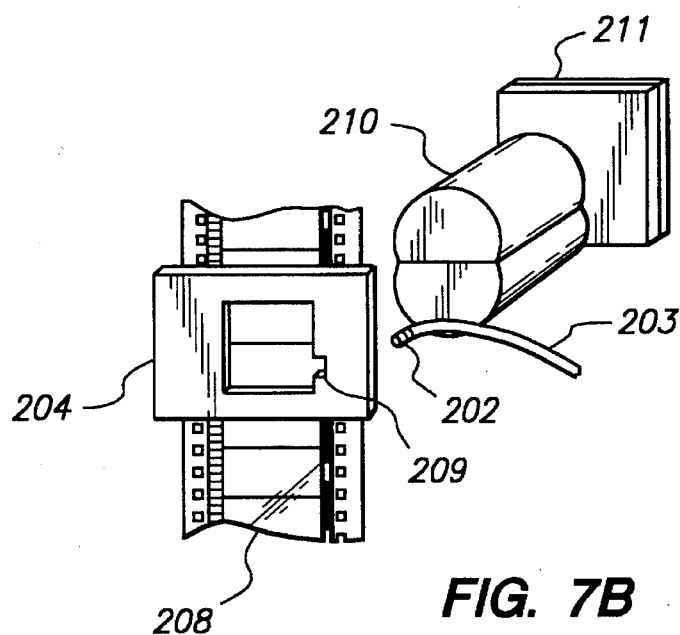

FIG. 7B is a perspective view of an index sensor from the direction of a lamp house, with the sensor mounted in the film gate area, and showing the aperture plate, film, projection lens, and electro-optical system.

Figure 7C:
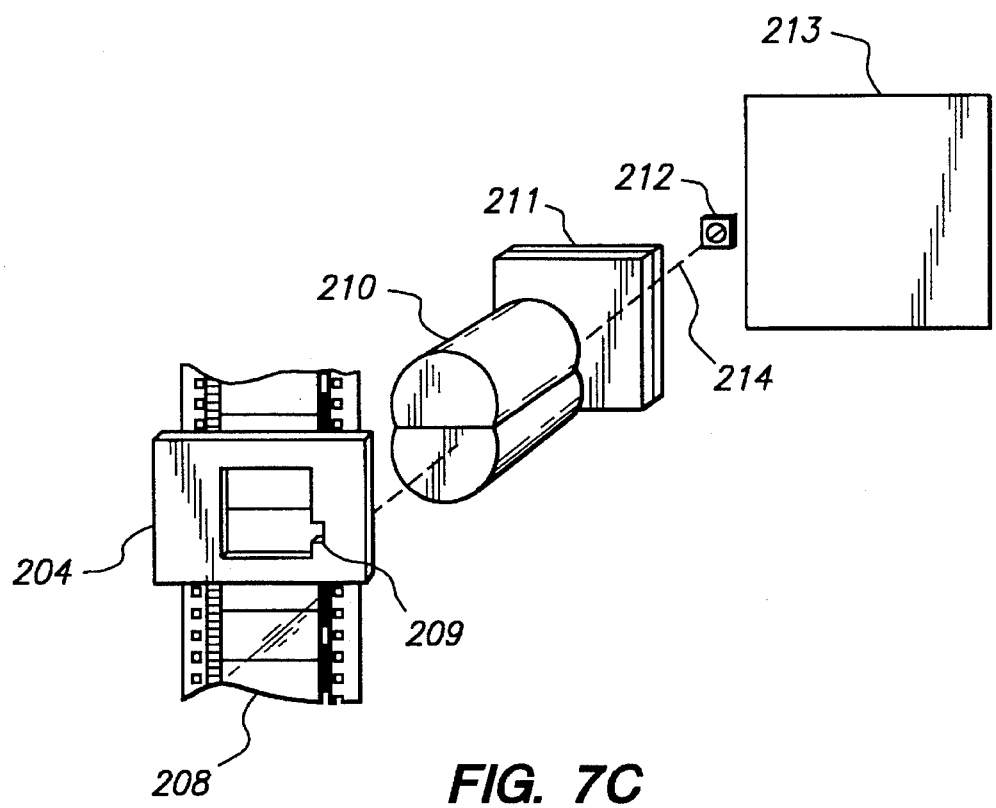

FIG. 7C is a perspective view of an index sensor from the direction of a lamp house, with the sensor mounted near the projection room port, external to the projector, and also showing the aperture plate, film, projection lens, and electro-optical system.

Figure 8:
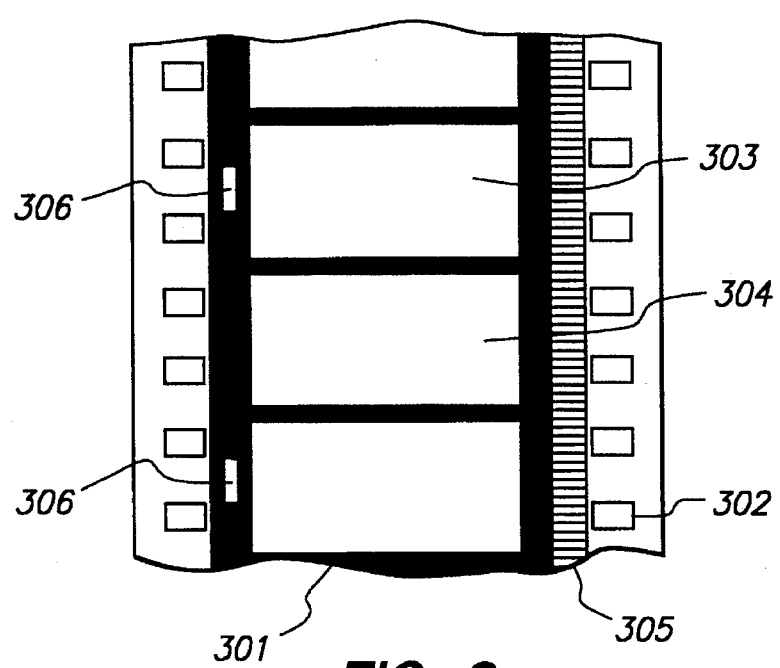

FIG. 8 shows a segment of film having the above-and-below format, and marked with subframe index marks.

Figure 9:
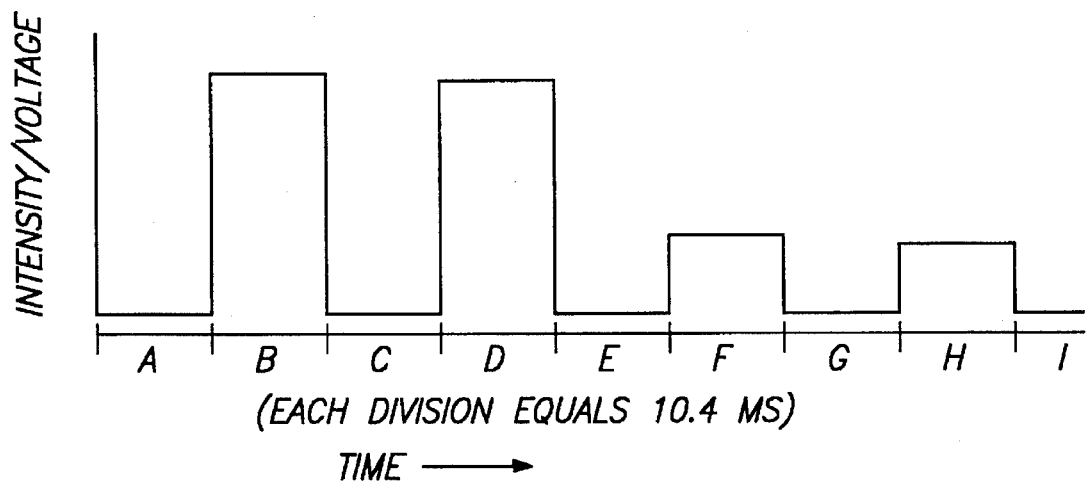

FIG. 9 is a graph of intensity (and related voltage) versus time, representing the output of an index sensor positioned to detect index marks of the type shown in FIG. 8.

Figure 10:
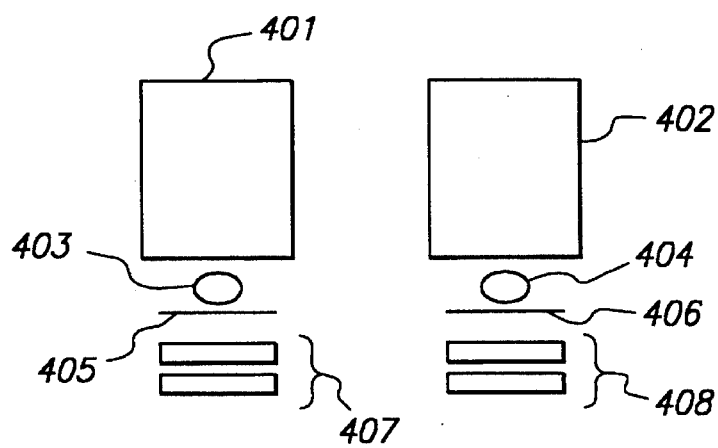

FIG. 10 is a simplified top view of a dual projector embodiment of the inventive system, which uses push-pull modulators to produce circularly polarized light.

DESCRIPTION OF THE PREFERRED EMBODIMENTS

Figures 1, 1A, 1B:
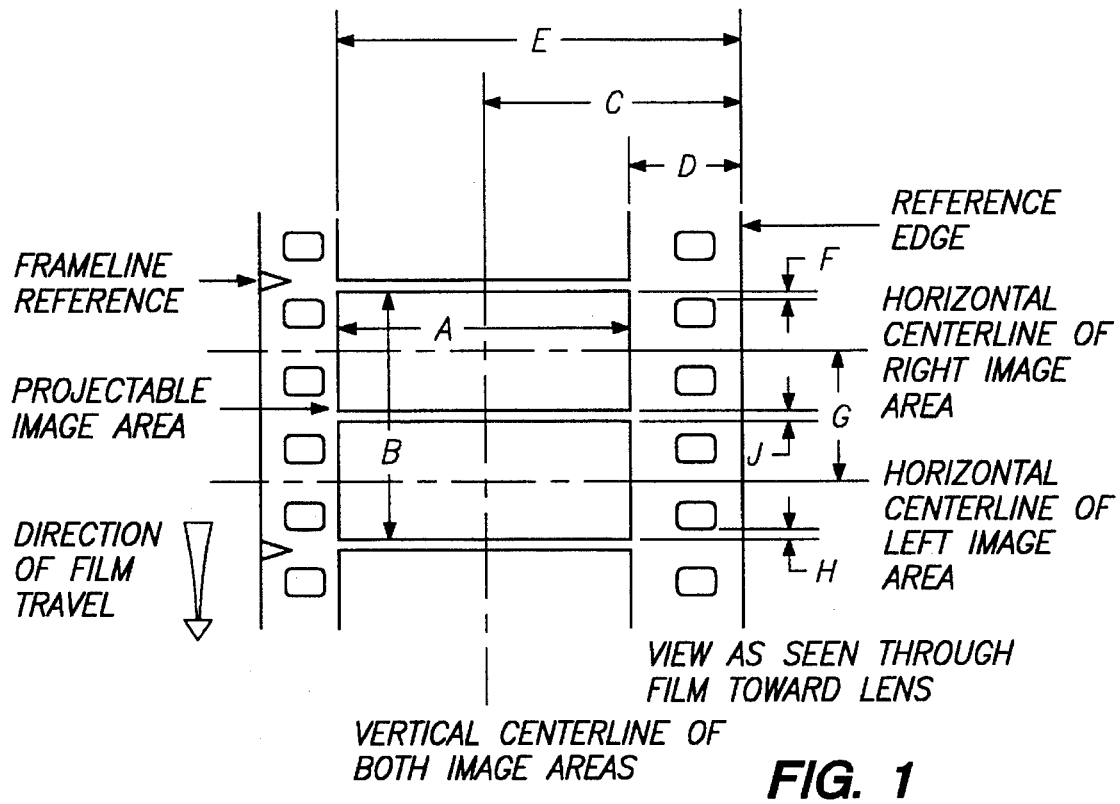
FIG. 1 is a segment of motion picture film which has an above-and-below 35 mm stereoscopic format.
FIG. 1(a) is a table of the dimensions of a "symmetrical" version of the above-and-below film format shown in FIG. 1.

FIG. 1 shows the layout of the above-and-below format on 35 mm film. This has become the accepted approach in the film industry for projection of stereoscopic motion pictures. Table 1 (of FIG. 1(a)) gives the specific dimensions for a "symmetrical" version of the above-and-below format. Table 2 (of FIG. 1(b)) gives the specific dimensions for an "asymmetrical" version of the above-and-below format.

The symmetrical version of the format is the format which is of interest to us, since for the symmetrical format, if subframe A and B are interchanged (in other words, if A is the lower subframe and B is the upper subframe), there will be no introduction of vertical parallax in projection. It will be seen by reading the rest of this disclosure that use of film having the symmetrical format is a key element in making the invention work. It is necessary for the symmetrical format to be employed, and it is assumed that the symmetrical format is used throughout this disclosure.

Figure 2:
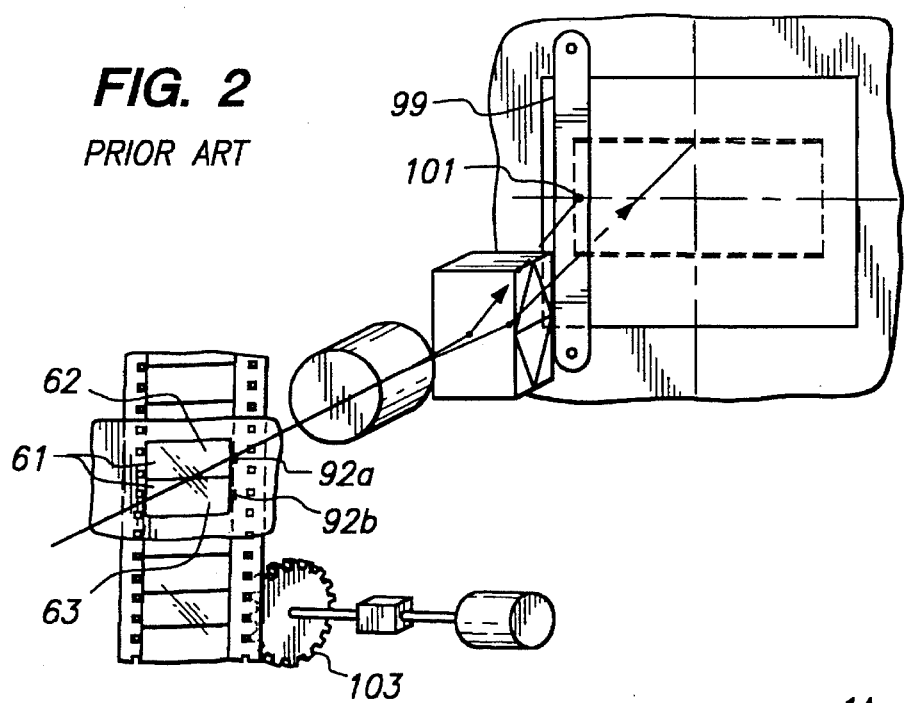
FIG. 2 is a perspective view of a prior art system which employs a manual means for detection of subframe position during projection.

FIG. 2 of the present disclosure (which corresponds to FIG. 18 of U.S. Pat. No. 4,017,166 to Kent et al.) is a prior art attempt to address the interchangeability of subframes, which presently defeats successful stereoscopic projection. In FIG. 2, transparent dot 92a (having a first color) is included at the center line of the right image of stereoscopic film frame 61, and transparent dot 92b (having a second color) is included at the center line of the left image of film frame 61. One of dots 92a and 92b is projected as image 101 on surface 99. By observing the color of the projected image 101, the projectionist is informed whether the film is being correctly projected in true stereo, or incorrectly projected in pseudo stereo. As has been mentioned, if the projectionist mis-threads the projector or misassembles the reels and upsets the sequence of subframes, the result will be a pseudoscopic rather than a stereoscopic projected image.

A key ingredient in the successful projection of stereoscopic images is for the left image to be projected through its assigned polarizer and the right image to be projected through its assigned polarizer. When linearly polarized light is used for encoding the images the only difference between the image codings is that their polarization axes are at 90 degrees to each other. Nevertheless, if the relationship between the perspective viewpoint and the polarizer is inverted, the stereoscopic image will be pseudoscopic, since the right eye will see the left eye's image and vice versa. Kent et al, in U.S. Pat. No. 4,017,166, explain that the indicia marks disclosed therein (i.e., dots 92a and 92b) can be used to automatically frame the film without the intervention of the operator to project stereo images, and to avoid pseudo images. To accomplish this, Kent et al. teach that a photo or other type of sensor should be positioned to sense the indicia marks. Signals from the sensor would be used to control the framing device via an electrical circuit and electromechanical actuator.

The present invention improves on this suggestion by Kent et al., by eliminating the need for an electromechanical actuator to accomplish automatic framing. Kent, et al. teach use of a motor or similar device to locate the subframes with respect to the aperture. This is an inelegant and time consuming procedure, which would be visible to audience members, and subject to concerns with regard to accurate positioning of the subframes. Those familiar with 35 mm motion picture projectors would undoubtedly agree that it would be a difficult task to retrofit a motor to the framing knob in a manner that would allow it to rapidly and accurately reposition the subframes with respect to the aperture. The instant invention on the other hand, acts virtually instantly and in a manner that would be impossible to detect, since it would not require reframing of the film.

Use of the index marks as suggested by Kent, et al. would require operator intervention for practical implementation. If the projectionist keeps an eye on projected index mark 101 (shown in FIG. 2), he can (if necessary) reframe the right and left subframes 62 and 63 using a frameline control 103. The problem with this approach is that there is usually no projectionist in attendance in the projection booth. Today projection is automated, and the projector is remotely started. There is, in all likelihood, no one in the projection booth. This being the case, the projectionist-operated means suggested by Kent, et al., is impractical.

FIGS. 3A and 3B of the present disclosure show means for using electromechanical actuators. Although the electrooptical means of the invention (described below with reference to FIGS. 4A, 4B, 5A, and 5B) will be superior in most applications, there may be merit to the electromechanical approaches illustrated in FIGS. 3A and 3B, as will be explained later in this disclosure.

FIGS. 4A, 4B, 5A, and 5B show electro-optical means for correcting the above-described problems with prior art systems. Electro-optical modulators 14 and 15 are used in front of the projection lens 8. Lens 8, in this case, is made up of two projection lenses 6 and 7, mounted in a single barrel. Mounted in front of projection lenses 6 and 7, or as part of the projection lenses, is linear polarizing filter ensemble 9. Polarizing filter ensemble 9 is made up of two sheet polarizers, 10 and 11. Axis 12 of polarizer 10 is orthogonal to axis 13 of polarizer 11. This type of projection lens is one which was offered for sale in the early 1950's by Bolex of Switzerland and in the last two decades by Stereovision International of Burbank, Calif. A lens of the type shown is also manufactured by Isco of Germany. Although for illustrative purposes FIGS. 4A, 4B, 5A, and 5B show only one type of projection means, the system of the invention need not include precisely this projection lens. Various other projection lenses and attachments, although of different designs, perform the identical function, and the invention described herein will work in conjunction with any of them.

With reference to FIGS. 4A, 4B, 5A, and 5B, it can be seen that motion picture film 1 (which can be 35 mm motion picture film) runs against aperture plate 2. Film 1 is made up of subframes comprising stereopairs (such as the stereopair consisting of subframes 3 and 4). Subframe index marks 1A are shown as a detail on film 1 in FIGS. 4A, 4B, 5A, and 5B.

A preferred embodiment of the index marks of the invention are index marks 306 shown in FIG. 8. In FIG. 8, index marks 306 are shown to be part of motion picture print 301. For completeness the sound track 305 and perforations 302 are also shown. Subframes 303 and 304 of FIG. 8 correspond to subframes 3 and 4 of FIG. 4A. It will be seen that every other subframe has attached to it, adjacent to it, or in association with it, an index mark 306 which is a clear area printed against a black or dark background. The reader will realize that black index marks against a clear background would work as well, and that any combination of colors or densities for the index marks and background may be employed as long as a photosensor is able to distinguish between the two. Furthermore, the index marks may be otherwise optically distinguishable from the background film region, or from each other, or from both the background region and each other. Throughout this specification, including in the claims, the phrase "index mark" is used in a broad sense, to denote any optically distinguishable mark or code.

Although the index marks in FIG. 8 are shown adjacent to alternate subframes on the side of the film away from the sound track, they might also be printed adjacent to the sound track. The index marks can alternatively be punched into the film, rather than printed on the film as part of the print stock's image carrying surface. We will return to the subject of how the index marks of the invention can be produced and other aspects of their format.

With reference again to FIG. 4A, sensor 5 is positioned to detect index marks 1A. Information about the light intensity detected by sensor 5 is supplied by part 5A to electronic control circuit 20 ("controller" 20). The sensor 5 may be a photo cell or it may be an optical system consisting of lenses and a light pipe or fiber optics cable. In the case that sensor 5 is a photo cell, part 5A consists of a set of electrical wires which transmit changes in voltage to controller 20. If sensor 5 takes the form of an optical system, then part 5A is a light pipe or fiber optics assembly, and a photo cell may be located within controller 20. The important concept is that a light sensor of some type is mounted so as to observe index marks 1A and report on their presence or absence to controller 20.

In response to data received from sensor 5, controller 20 appropriately powers the push-pull modulator consisting of liquid crystal panels 14 and 15. Panels 14 and 15 are mounted parallel to each other, with their axes, respectively identified as 16 and 17, rubbed orthogonally. The planes of panels 14 and 15 are substantially perpendicular to the lens axes of lens 8. The push-pull modulator is preferably constructed in accordance with the teaching of U.S. Pat. No. 4,792,850. Lines 18 and 19 provide electrical power from controller 20 to cells 14 and 15. Although each of lines 18 and 19 is shown as a single line in FIG. 4A, it is contemplated that each will be embodied as a pair of cables to properly power each cell and provide suitable electrical potential.

The light modulator formed by panels 14 and 15 can be mounted outboard of polarizer unit 9 and lens 8 (which can be any existing projection lens of the type described herein), or it can be an integral part of optic 8,9. This disclosure is not meant to be limited to the embodiment shown, in which the modulator is an attachment to unit 9 and lens 8.

FIG. 7A is a detailed representation of the means for mounting the motion picture film in the projector, from the front of the machine. Although shutter 206 is three-bladed, two-bladed shutters (of the type shown in FIG. 6) are more commonly used in motion picture theaters. In FIG. 7A, lamp 205 provides illumination, three-bladed shutter 206 interrupts the images, and aperture plate 204 (which corresponds to aperture plate 2 of FIG. 4A) limits the size of the projected image which is delineated by aperture 201. Aperture plate 204 is mounted in the film trap plate 207, and, as is typical with 35 mm projectors, it is interchangeable. Notch 209 is cut into aperture plate 204. This notch provides sensor 202 (which corresponds to sensor 5) with a view of the index marks which are printed on the film.

Cable 203 of FIG. 7A corresponds to means 5A of FIGS. 4A, 4B, 5A, and 5B. If sensor 202 is a photo cell, then cable 203 should be an electrical connection for conveying the sensor's electrical output signal. If, on the other hand, sensor 202 is an optical system (including a remotely mounted photo cell, such as a photo cell mounted within controller 20 of FIG. 4A) designed to focus on an index mark which can be seen through notch 209, then means 203 should be a light pipe or a fiber optics cable which conveys the illumination to the controller 20. In either case, variations in illumination which are associated with the index mark's presence or absence are reported to the controller.

In response to such information regarding the presence or absence of an index mark, the controller changes the voltage outputted along cables 18 and 19 to cells 14 and 15 (in the FIG. 4A embodiment) or along cables 21, 22, 23, and 31 to cells 32, 26, 27, and 30, respectively (in the FIG. 4B embodiment), thus changing the net retardation of each push-pull modulator device comprised by the cells.

With reference to FIG. 4A (and FIGS. 3A, 3B, 4B, 5A, and 5B), when a film image is being projected without the benefit of the light modulation means (push-pull device 14,15, push-pull device 26,27, push-pull device 30,32, cell 33, cells 39 and 40, means 58, or means 60), subframes 3 and 4 are polarized by polarization elements 10 and 11. Because the axes 12 and 13 of polarization of linear polarizers 10 and 11 are orthogonal, projected subframes 3 and 4 will be similarly polarized. When the images are projected by means of lens 8 on an appropriate motion picture screen, then the images of each projected subframe will be polarized and superimposed. Those familiar with the art will know that such a screen must have a metallic surface, typically aluminum, in order to preserve the characteristics of polarized light.

A selection device, such as polarizing glasses with linear polarizing filters similar to the filters used in the filter ensemble 9, is worn by each and every spectator, so that each spectator will be able to see the appropriate image in the appropriate eye. The mind of each spectator will fuse the images into a stereoscopic image.

If the projectionist has mis-threaded the projector, or mis-assembled reels, the left subframe and right subframe will be interchanged and the axis of polarized light associated with each subframe is now that which should have been associated with the other subframe. Hence, the viewer wearing polarizing glasses, when looking at the screen, will see the image meant for the left eye by the right eye and the image meant for the right eye by the left eye. The result is called a pseudostereoscopic image. It is difficult for untrained people to articulate their perception when they see an image like this. Some people call it blurry, some people will find it to be painful, some people won't notice that there is anything wrong—but they won't be seeing and appreciating a true stereoscopic image. The major problem with this interchange of images is that it produces a psychological conflict between the stereopsis cue and the other three-dimensional cues such as perspective, interposition, and relative size. This mistake is to be avoided at all costs when projecting stereoscopic images. It is a goal of this invention to provide a means for prevention of this defect in conventional stereo projection techniques.

There is another problem worth addressing with regard to conventional projection systems. This is the fact that linear polarizers when used as stereoscopic selection devices require the viewer to maintain his or her head position to within a few degrees. People looking at movies, who are trying to have a good time and hoping that they will be entertained, can't be expected to hold their heads rigidly in one place. If they tip their heads even a degree or so, as is well known and described by the Law of Malus, there will be a substantial increase in crosstalk between the left and right image channels with a resultant ghost image. Land attempted to cure the problem in his U.S. Pat. No. 2,099,694, by means of circular polarization in which head tipping would result in no appreciable perception of a ghost image.

In the early 1980's, there was an attempt to use circular polarization for a selection device for the projection of stereoscopic movies, in particular for a few play-dates of the movie, "Jaws 3-D." The process never gained a foothold, despite its obvious advantages. The exhibitors and the producers of the film were not inclined to use the circular process because of economic and technical reasons; they had a large inventory of linear glasses, and increased ghosting was reported in the few theaters in which the circular process was used.

One of the problems with the use of circular polarizers is that, compared with linear polarizers, they have a lower extinction ratio. This is the principal figure of merit applied to polarizers. The extinction ratio for linear polarizers, which is sometimes called the contrast ratio, or dynamic range, is the ratio of the transmission of the polarizer and analyzer in the parallel axis state, to the transmission of the polarizer and analyzer in the crossed axes state.

Typically linear polarizers employed for stereoscopic selection devices have extinction ratios measured in the 200–400:1 range. This can provide good channel isolation. But circular polarizers typically have an extinction ratio of less than 100:1. These are the numbers published by manufacturers, and they have been confirmed in our laboratory. Such polarizers are made of plastic sheets and are known as dichroic polarizers.

A push-pull modulator (i.e., device 14,15, device 26,27, or device 30,32) in conjunction with a linear polarizer, produces circular polarized light which has a higher dynamic range than circular polarizers made of plastic sheets of sandwiched dichroic polarizer and retarder. Indeed, if properly constructed, the circularly polarized light outputted by a push-pull modulator, when analyzed by a sheet circular polarizer, closely approaches the extinction ratio of linear polarizers. Therefore, the use of a push-pull modulator can provide circular polarized light with a high extinction ratio. This will overcome the principal defect of the currently employed linear polarizers and will allow for audience members to head relax and tip their heads any which way they desire. At last, a girl will be able to see a good quality image while resting her head on her boyfriend's shoulder at a 3-D movie, providing the push-pull modulator is employed to convert the linearly polarized light into high extinction ratio circularly polarized light, while simultaneously functioning to virtually instantaneously turn pseudoscopic images into proper stereoscopic images.

As mentioned above, the electro-optical modulators which are shown here are not necessarily meant to be outboard of the lens or the projection attachment. They can alternatively be built into the optical system as an integral part of the design. Thus the invention has the advantage of being useful in situations where projection lenses exist on a retrofit basis in order to cure the problems inherent in mis-threaded or mis-spliced film and to overcome the drawback of linear polarization for image selection.

The operation of push-pull modulators useful in the present invention has been described in U.S. Pat. No. 4,792,850. With reference to FIG. 4A, the rub axes 16 and 17 of push-pull modulator cells 14 and 15 are orthogonal, and the axes 12 and 13 of linear polarizers 10 and 11 are at 45 degree angles to the rub axes 16 and 17. With reference to FIG. 4B, the rub axes 28 and 29 of cells 32 and 30, and rub axis 24 and 25 of cells 26 and 27 are orthogonal, and the axes 12 and 13 of linear polarizers 10 and 11 are at 45 degree angles to rub axes 24, 25, 28, and 29.

This fulfills the condition necessary to turn linearly polarized light into circularly polarized light, providing the cells are driven to a net retardation of a quarter of the wavelength of light, or for a phase shift of ninety degrees. When the forward cell (cell 14 in FIG. 4A, or cells 26 and 32 in FIG. 4B) is at a high electric potential it is essentially isotropic, and when the rearward cell (cell 15 in FIG. 4A or cells 27 and 30 in FIG. 4B), is driven to a low electric potential it is essentially anisotropic and responsible for the 90 degree phase shift necessary to produce the circularly polarized light. The combination of the forward and rearward cells in optical series results in a compensation of the residual birefringence associated with surface mode devices and thus enables the outputting of very pure circularly polarized light, resulting in a selection device with a good extinction ratio.

The described orientation of the components allows for the simultaneous outputting of circularly polarized light of one handedness for one projected subframe image and of the other handedness for the other projected subframe image. If sensor 5 does not see the required index mark 1A of motion picture film 1 in the aperture, controller 20 reverses the electric potential which is applied to the push-pull modulator cells, so that the cell which had been driven to a high potential is driven to a low potential and vice versa, thereby switching the characteristic of circularly polarized light from one handedness to the other. For example, if polarizer 10, used in combination with the push-pull modulator had been outputting left-handed circularly polarized light, when the electric potential to the push-pull modulator cells is reversed, it will now be outputting right-handed circularly polarized light.

By this means, it is possible to provide the virtually instantaneous maintenance of the appropriate type of polarized light to match the desired subframe despite the fact that the subframes position may have been interchanged in the aperture of the projector through some mishap. Our measurements show that the change between right and left handed circularly polarized light, using surface mode cells with a 7 micron gap filled with Merck ZLI-1565, will take only 0.5 milliseconds. Later we will discuss the timing of the film during the projection cycle so the reader will be better able to appreciate the ability of the modulator to respond to changes in the sub-frame orientation in a manner that will be undetectable.

The audience members in this case, instead of wearing spectacles with linear polarized filters, wear spectacles with circular polarizing filters. One eye sees through a right-handed circular polarizer, and the other eye sees through a left-handed circular polarizer, as proposed by Land.

The FIG. 4B embodiment of the invention differs from the embodiment of FIG. 4A, in that the FIG. 4B embodiment includes two push-pull modulators rather than one. In FIG. 4B, a top modulator (including liquid crystal cells 26 and 27 with mutually orthogonal rub axes 24 and 25) and a bottom modulator (including liquid crystal cells 30 and 32 with mutually orthogonal rub axes 29 and 28) are employed to modulate the projection of each subframe. Two modulators are employed because it may be less expensive to make two smaller push-pull modulators than one large one. It may also be more convenient to use two smaller push-pull modulators, depending upon whether or not the modulator is mounted external to the lens or projection attachment or is built into and is part of the lens. It will be apparent also that if the modulator is part of the lens, then the polarizing element can be placed at any convenient location within the optical system providing the polarizer is between the modulator and the film.

In FIG. 4B, photosensor 5 can be positioned to observe index marks 1A printed on film 1. Line 5A supplies to controller 20 either electrical information (if photosensor 5 is connected to the end of line 5A remote from controller 20 as shown in FIG. 4B) or light information (if photosensor 5 is replaced by a photosensor, not shown, mounted within controller 20). Controller 20 provides coordinated high and low electrical voltages through electric lines 22 and 23 to the top push-pull modulator (comprising cells 26 and 27). In a similar fashion, controller 20 provides suitable high and low voltages through lines 21 and 31 to liquid crystal panels 30 and 32 which comprise the bottom push-pull modulator.

The function of the FIG. 4B apparatus is conceptually identical to the apparatus described above with reference to FIG. 4A. We shall assume for the sake of discussion that the system is in a state in which the "close" liquid crystal panels 32 and 26 are at a high electric potential, the other liquid crystal panels 27 and 30 are at a low electric potential, the top modulator is outputting left-handed circularly polarized light, and the bottom modulator is outputting right-handed circularly polarized light. In this state, if sensor 5 fails to detect a distinctive index mark 1A at the expected time, controller 20 automatically reverses the electric potential to the two cells of each modulator, and thus the handedness of circularly polarized light transmitted by each modulator. Thus, despite the fact that the subframes have been interchanged, the characteristic of the polarized light has also been interchanged, so that each eye will continue to see the appropriate image.

In some situations, where the exhibitor prefers to employ lower priced linearly polarizing glasses, it may be desirable to project using linearly polarized light. Those versed in the art will appreciate that it is possible to convert circularly polarized light to linearly polarized light by means of a plastic sheet of quarter wave retarder, readily available from several suppliers of polarizer. In this case one would simply place such a retarder in front of the push-pull modulators shown in FIG. 3A, 3B, 4A, or 4B.

Another approach is to adjust the bias voltage, or low voltage, to tune each push-pull modulator to output linear rather than circular polarized light. The resultant speed of transition will be reduced to one millisecond or so, because the liquid crystal material must now be driven to half wave rather than quarter wave retardation. This is fast enough for the intended application. Since the projected image remains on the screen for a very much greater length of time, the symmetry of response is preserved because the push-pull device treats both states identically, whereas the approach described next loses that symmetry. That is to say, the dynamic range of the push-pull approach will be the same for both eyes, whereas in the approach described next, one eye will see an image with higher dynamic range than the other. However, the lesser dynamic range may be adequate, and the device described below has the advantage of being less costly to manufacture since a single liquid crystal panel is used in the optical system instead of two required for the push-pull device.

Alternative embodiments are shown in FIGS. 5A and 5B, which include either one large surface mode panel 33 (shown in FIG. 5A) through which both subframes are projected, or two smaller panels 39 and 40 (shown in FIG. 5B) through each of which is projected the right and left subframes. The reasons for using two such smaller panels have been given in the explanation provided for FIG. 4B.

In FIG. 5A, surface mode device 33 has axis 34, and comprises a single liquid crystal panel in the optical path. Axis 34 is oriented at an angle substantially equal to forty-five degrees with respect to axes 12 and 13 of individual polarizers 10 and 11 of element 9. High or low electric potential is provided by controller 20, for the reasons which have been given, to coordinate the characteristic of polarized light with subframes 3 and 4 of motion picture film 1 which rests against aperture plate 2, as previously described. The value of the electrical potential provided by controller 20 depends on the presence or absence of an index mark in the field of view of sensor 5 (which is in turn represented by a light or an electrical signal communicated along path 5A to controller 20). Line 32 provides either a high or a low electric potential to cell 33. When 33 has high electric potential, given that it is a surface mode modulator, it will then essentially be isotropic to the light rays passing through it, in which case the axes of the polarized light from filters 10 and 11 will suffer no rotation. It is possible to tune the surface mode liquid crystal panel of cell 33, which is a variable retarder, so that cell 33 is driven at low electric potential (sometimes known as the bias voltage) to half-wave retardation, in which case the axis of polarized light will be rotated through 90 degrees by cell 33. Hence the orientation of the axes of polarizers 10 and 11 will be interchanged, and what had previously been the orientation for the right eye will become the orientation for the left eye.

In this manner, if the film has been mis-spliced or mis-adjusted, it will be compensated for by means of controller 20 and the voltage which it provides to cell 33.

The same explanation applies to FIG. 5B, but for convenience, either for ease of manufacturing or to reduce costs, cell 33 of FIG. 5A has been replaced by two surface mode cells 37 and 39 located above and below each other. Surface mode devices 37 and 39 have rub axes 40 and 38, respectively, and function in an identical manner to that describe with reference to FIG. 4A. When a high voltage is applied to cell 37 or 39, each is isotropic and the original orientation of the polarized light axes along axes 12 and 13 is maintained. When the appropriate low voltage is applied thereto, variable retarder cells 37 and 39 become birefringent causing a phase shift to take place in the resolved orthogonal components of polarized light passing therethrough. Since the axes 12 and 13 of the polarizers of the projection lens are at 45 degrees to the axis (or axes) of the liquid crystal variable retarder 33 (or retarders 37 and 38), the polarized light will be resolved into the components needed for the half wave phase shift need to toggle the axis or axes through ninety degrees. In this manner compensation for mis-framing or mis-splicing can be made. The viewers watching the screen through linearly polarizing spectacles will see a proper stereoscopic rather than a pseudoscopic image.

As stated above, it will be obvious to persons of ordinary skill in the art that it is possible to convert linear polarized light to circular polarized light by means of a quarter-wave retarder. Accordingly, with respect to FIG. 5A and 5B, it is possible to output circularly polarized light from these devices if so desired by placing a quarter-wave retarder whose axis is at 45 degrees to the rub axis of the surface mode part either in front of, or behind, the surface mode part. That is, the quarter-wave sheet retarder can be placed between the surface mode device and the projection screen, or between the surface mode device and the linear polarizer.

FIG. 6 is an interrupting shutter, which was introduced by John A. Pross in 1903, and which is suitable for use in the system of the invention. Arrow 102 shows the direction of rotation of shutter 101. Aperture 103 is periodically blocked by rotating shutter 101. Shutter 101 rotates at a constant velocity, and it is usually has a two-bladed design so that it interrupts each projected frame once. Each blade occupies an arc of 90 degrees.

When the film is being pulled down in the projector gate, the shutter prevents the projection of moving film since this would produce a blurry image. When the film is at rest, the shutter continues to rotate and interrupts the image while it is projected. At the usual frame rate of 24 frames per second (fps), this results in an effective rate of 48 fps. The parameter of concern here is the critical fusion frequency, and, for the brightness used in theatrical cinemas, 48 interruptions per second, or 48 effective fps provides for a flickerless image.

FIG. 9 represents the intensity of light incident at index mark sensor 5 during rotation of shutter 103 (and thus also represents the output voltage produced by sensor 5). The appearance of the FIG. 9 graph is a direct result of the operation of the Pross shutter. Each division along the horizontal (time) axis in FIG. 9 corresponds to a 10.4 millisecond period, which in turn corresponds to one-quarter of the shutter's rotational cycle (i.e., 90 degrees of shutter rotation). At a film speed of 24 frames per second, one cycle of shutter rotation is 41.7 milliseconds. Hence, a quarter of the cycle is 10.4 milliseconds.

In FIG. 9, period "A" identifies the pull-down portion of the cycle, during which new subframes are pulled into the aperture, and during which the shutter blocks the frame. Period B is the projection portion of the cycle, during which the output of the sensor is determined by the density of the index mark. Period C is the interruption phase of the cycle, wherein the shutter is juxtaposed between the light source and the film serving to increase the effective fps rate and thereby eliminate flicker. Period D is the second projection of the subframes, during which the sensor can detect an index mark. Periods E, F, G, H, and I, continue the graph into the next cycle, and represent subsequent repetitions of periods A, B, C, D, and A, respectively.

During pull-down period A (and during shutter interruption period C) the light intensity seen by the sensor is at a minimum. If during the next quarter-cycle B (or D), the sensor detects a clear or transparent index mark (as discussed earlier), then the sensor will receive a high light intensity, and will assert a proportional (high) output voltage.

A second repetition of the cycle will then occur (during periods E through H). If the light intensity (and the proportional sensor output voltage) during period F is lower than for period D (indicating the absence of an index mark on the film), controller 20 (in the embodiment of FIG. 3A, 3B, 4A, 4B, 5A, or 5B) provides appropriate voltage to change the handedness (or polarization axis) of the polarized light to be projected, as discussed earlier. Note that the intensity measured during period F has an intermediate value between the intensity occurring during the interruption phases (i.e., period C or E) and the index mark detection phases (i.e., period B or D), to indicate that the index mark is missing and the sensor sees the light intensity modulated by the film's maximum density ("D-max"). It is possible and desirable to include an automatic gain control circuit within controller 20 to set the appropriate level for the sensor, to accommodate changes in the intensity of the lamp, the density of the index marks, and D-max of the print stock.

Controller 20 controls the phase of the driving voltage it supplies to the electro-optical light modulators (i.e., the driving voltage signal supplied on lines 18 and 19 in FIG. 4A) in response to the sensor output voltage (i.e., the sensor output generated during periods B, D, F, and H of FIG. 9). In one class of embodiments, controller 20 reverses (i.e., shifts by 180 degrees) the phase of each driving voltage signal in response to each level change (transition) in sensor output voltage, thereby preventing pseudostereoscopic projection of the film images. In such embodiments, for example, controller 20 would reverse the driving voltage signal phase in response to a sensor output voltage transition (from high to low) between period D and period F. However, controller 20 would not reverse the driving voltage signal phase between periods B and D, or between periods F and H.

It should be understood that the surface mode electro-optical modulators discussed herein are fast enough to meet the needs of the inventive system for most applications. For a shutter quarter-cycle of 10.4 milliseconds, in particular, the transition time of a typical push-pull modulator (0.5 milliseconds) is adequate. To this period of 0.5 milliseconds should be added a 0.2 millisecond lag between the time the electric potential is applied and the time the transition takes place. Therefore a total of 0.7 milliseconds typically elapses between the time the Sensor sees a change in status of an index mark and the time the handedness (or polarization direction) of the polarized light changes.

When one considers that the projection cycle is more than 40 milliseconds, audience members will not be able to see the transition between left-handed and right-handed circularly polarized light, or the toggling of linearly polarized axes, and the image will be projected with complete continuity of the stereoscopic effect. Other types of liquid crystal devices or electro-optical modulators may be used in this invention.

FIG. 7A, described above, is a view of the film gate area from the direction of the lens toward the lamp. In FIG. 7A, three-bladed shutter 206 is employed, rather than two-bladed shutter 101 of FIG. 6.

FIG. 7B is a view of the film gate area of FIG. 7A, but from the direction of the lamp housing towards the screen (not shown in FIG. 7B). In FIGS. 7A and 7B, aperture plate 204 has notch 209 cut in it through which the index mark may be seen by sensor 202. Typically, the index mark is printed on film 208. Sensor 202 is mounted in the gate area of the projector. Projection lens 210 projects the subframes through modulator 211, which can be any of the single or multiple push-pull or single panel modulators discussed earlier.

Cable 203 communicates the signal produced by sensor 202 to the controller 20. As discussed above, sensor 202 may consist of an integral photosensor. In response to the output of the sensor, controller 20 determines the drive voltages for the electro-optical modulators.

In a class of alternative embodiments, element 202 is not a sensor of the type producing an electrical output signal. Elements 202 and 203 are instead an optical system which includes a fiber optics cable or a light pipe which relays light intensity information regarding the index marks to controller 20. In this class of systems, controller 20 can include a photo cell which receives light signals from elements 202 and 203.

FIG. 7C is a variation on the FIG. 7B embodiment in which sensor 202 (of FIG. 7B) is replaced by sensor 212. Sensor 212 is positioned outboard, in the light path 214 of the image of the index mark (notch 209 also lies along light path 214). The motion picture image is projected onto screen 213. Sensor 212 is preferably a photosensor, and can be mounted, for example, on the wall or on the projection port of a projection booth. In some circumstances it is more convenient to mount the system's sensor in an outboard position, such as the position of sensor 212 in FIG. 7C, rather than in the position in which sensor 202 is mounted in FIG. 7B.

In recognition of the high quality of the circularly polarized light produced by the push-pull modulator described above, it is within the scope of the invention to use such a push-pull modulator in a stereoscopic projection system employing dual projectors, as shown FIG. 10. Projectors 401 and 402 of FIG. 10 are synchronized to project stereoscopic motion pictures through the assembly comprising lens 403, polarization filter 405, and push-pull modulator 407, and the assembly comprising lens 404, polarization filter 406, and push-pull modulator 408, respectively.

Techniques for projecting stereoscopic motion pictures using left and right projectors which have been interlocked with matched lenses (and related dual projector technology) are well known, and are practiced on a daily basis in various venues throughout the world. Practically all of them use linearly polarized light. The use of circularly polarized techniques has been proposed, but people in the field have not been satisfied with systems that output circularly polarized light because such systems have a reduced extinction ratio. Manufacturers of circular polarization apparatus typically claim extinction ratios or 90:1 or 100:1 for their products, whereas their potential customers have become accustomed to using linear polarization apparatus having two or three times that extinction ratio. By using push-pull modulators 407 and 408 (of the type described above) in the FIG. 10 system, it is possible to closely approach the good extinction ratio of linear polarization apparatus, and at the same time achieve circular polarization.

In the FIG. 10 system, push-pull devices 407 and 408 are driven at a fixed electric potential for both panels. No control system is needed. Devices 407 and 408 are simply driven to and maintained at set voltages in order to output circularly polarized light.

To observe the images projected by the system of FIG. 10, each member of the audience wears polarizing spectacles which have a left-handed circular polarizer for one eye and a right-handed circular polarizer for the other eye. By this means, reduction of crosstalk and allowance for head tipping can be maintained. The FIG. 10 embodiment is especially useful in world's fair type venues or other special presentations in which 70 mm format projectors are used, because, in such applications, in which there is a striving for the ultimate in projection, it is desirable for the audience members to have freedom to tip their heads while viewing the film.

The embodiments of above-mentioned FIGS. 3A and 3B, include electromechanical means for achieving the ends of the invention, which are discussed throughout this disclosure. In FIG. 3A, motor 51 is used to rotate quarter wave retarder sheet 56 in response to signals supplied (via line 50) from controller 20. Timing gear 52 is attached to the shaft of motor 51, and timing belt 53 moves retarder sheet 56, which is mounted in a rim surrounded by teeth 58 for engaging belt 53. When the axis (identified by arrow 57) of retarder 56 is horizontal as shown in FIG. 3A, the system will sequentially output circularly polarized light of alternating (left and right) handedness for the left and right subframes of a stereoscopic motion picture film. FIG. 3A shows the system with retarder 56 positioned so that sensor 5 will see index marks 1A on the motion picture film. If controller 20 determines (in response to information from sensor 5) that no index mark 1A is present in the field of view of sensor 5 at a relevant time, it causes retarder 56 to be rotated through ninety degrees so that the handedness of each subframe's polarization is interchanged. In this manner the projected image is maintained in a stereoscopic rather than a pseudoscopic condition.

The system of FIG. 3B is a variation of the FIG. 3A system in which the subframes are encoded with linearly polarized light. Polarizer holder 60 is made up of polarizer sections 54 and 55, which have orthogonal polarization axes 61 and 59, respectively. Axes 61 and 59 are oriented in a manner which is standard for the projection of stereoscopic films. The top subframe projects through section 54 and the bottom through 55, when the subframes are properly located.

If however, the subframes become interchanged and sensor 5 sees that the index mark is missing, polarizer holder 60 is rotated through 180 degrees by motor 51, by the same mechanical means described above in the context of FIG. 3A. In this way the polarizer sections through which the image forming light of each subframe passes will have their axes of polarization rotated through ninety degrees, so that the sub-frames will maintain the proper polarization encoding and a stereoscopic rather than a pseudoscopic image will be projected.

It will be obvious to those skilled in the art that other types of electromechanical actuators can be employed as substitutes for motor 51, gear 52, and belt 53, in variations on the embodiments described with reference to FIGS. 3A and 3B.

Various modifications and alterations in the structure and method of operation of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A system for projecting stereoscopic images from motion picture film onto a screen, wherein the film has a symmetrical above-and-below format in which left image subframes alternate with right image subframes, including:

a polarization control means for controlling a polarization characteristic of light which propagates simultaneously through a left image subframe and a right image subframe and thereafter simultaneously illuminates the screen, wherein the polarization control means includes an electro-optical light modulation means whose optical state depends on an externally generated driving voltage;

a sensor positioned for detecting the presence or absence of index marks on the film, wherein the sensor generates a sensor signal indicative of the presence or absence of said index marks; and a means for generating the driving voltage in response to the sensor signal and supplying the driving voltage to the electro-optical light modulation means, wherein the driving voltage maintains the electro-optical light modulation means in an optical state for projecting a stereoscopic image and preventing projection of a pseudostereoscopic image.

2. The system of claim 1, wherein the polarization control means includes a means for circularly polarizing the light, and wherein the polarization characteristic is the handedness of the circularly polarized light.

3. The system of claim 1, wherein the polarization control means includes a means for linearly-polarizing the light, and wherein the polarization characteristic is the polarization axis of the linearly polarized light.

4. A system for projecting stereoscopic images onto a screen, including:

means for illuminating the screen with a light beam, including means for passing the light beam simultaneously through a left image subframe of a motion picture film and a right image subframe of the motion picture film, wherein the film has a symmetrical above-and-below format in which left image subframes alternate with right image subframes, wherein the light beam includes light portions which have simultaneously propagated through the left image subframe and the right image subframe and which simultaneously illuminate the screen after passing simultaneously through said left image subframe and said right image subframe;

a polarization control means mounted in the path of the light beam for controlling a polarization characteristic of the light beam, wherein the polarization control means includes an electro-optical light modulation means whose optical state depends on an externally generated driving voltage;

a sensor positioned for detecting the presence or absence of index marks on the film, wherein the sensor generates a sensor signal indicative of the presence or absence of said index marks; and a means for generating the driving voltage in response to the sensor signal and supplying the driving voltage to the electro-optical light modulation means, wherein the driving voltage maintains the electro-optical light modulation means in an optical state for projecting a stereoscopic image and preventing projection of a pseudostereoscopic image.

5. The system of claim 4, wherein the sensor is positioned to detect index marks on a side portion of the film adjacent each of the right image subframes or each of the left image subframes.

6. The system of claim 5, wherein the film also includes a sound track on a second side portion, wherein the second side portion is opposite the side portion including the index marks.

7. The system of claim 5, wherein the side portion of the film includes a border region surrounding the index marks, wherein each of the index marks is significantly more transmissive than is the border region, and wherein the sensor signal has an amplitude proportional to the intensity of light transmitted through the side portion of the film to the sensor.

8. The system of claim 4, wherein the polarization control means includes a means for circularly polarizing the light beam, and wherein the polarization characteristic is the handedness of the circularly polarized light beam.

9. The system of claim 4, wherein the polarization control means includes a means for linearly polarizing the light beam, and wherein the polarization characteristic is the polarization axis of the linearly polarized light beam.

* * * * *